United States Patent [19]

Klein

[11] 3,976,435

[45] Aug. 24, 1976

[54] POROUS ELECTRODES AND ELECTROLYTIC CAPACITORS MADE THEREFROM

[75] Inventor: Gerhart P. Klein, Manchester, Mass.

[73] Assignee: P. R. Mallory & Co. Inc., Indianapolis, Ind.

[22] Filed: Nov. 2, 1973

[21] Appl. No.: 412,309

Related U.S. Application Data

[60] Division of Ser. No. 182,782, Sept. 12, 1971, abandoned, which is a continuation-in-part of Ser. No. 17,519, March 7, 1970, abandoned, which is a continuation-in-part of Ser. No. 810,405, Sept. 13, 1968, abandoned, which is a division of Ser. No. 552,312, May 23, 1966, Pat. No. 3,422,515.

[52] U.S. Cl. ............................... 29/192 R; 29/182; 75/.5 R; 75/.5 B; 75/200
[51] Int. Cl.² ............................................ B22F 3/22
[58] Field of Search ..................................... 317/230

[56] References Cited
UNITED STATES PATENTS

| 2,198,702 | 4/1940 | Koehring | 75/222 |
|---|---|---|---|
| 2,617,863 | 11/1952 | Stinson | 317/230 |
| 2,733,389 | 1/1956 | Ellison | 317/230 |
| 2,869,215 | 1/1959 | Smith | 264/28 |
| 3,115,596 | 12/1963 | Fritsch | 317/230 |
| 3,144,328 | 8/1964 | Doty | 75/200 |
| 3,196,323 | 7/1965 | Rogers et al. | 317/230 |
| 3,206,658 | 9/1965 | Markarian | 317/230 |
| 3,234,308 | 2/1966 | Herrman | 264/63 |
| 3,330,892 | 7/1967 | Herrman | 264/63 |
| 3,346,680 | 10/1967 | Bush | 264/44 |
| 3,403,303 | 9/1968 | Klein | 317/230 |
| 3,465,426 | 9/1969 | Baier et al. | 29/570 |
| 3,476,557 | 11/1969 | Fincham | 317/230 X |
| 3,512,571 | 5/1970 | Phelps | 164/37 |

OTHER PUBLICATIONS

Webster's Third New International Dictionary, G.&C. Merriam Co. Springfield, Mass., 1966, p. 907.

*Primary Examiner*—Arthur J. Steiner
*Attorney, Agent, or Firm*—Hoffmann, Meyer & Hanson

[57] ABSTRACT

Porous anodes suitable for use in capacitors which involves forming moistened metal powder into a mass, freezing the moistened mass thereby bonding the metal powder together and sintering the mass to convert it to a porous pellet suitable for use as an anode for a capacitor. The anodes have a sintered density below 12 g/cc and specific capacitance of at least 2,000 uFV/g.

4 Claims, 12 Drawing Figures

FIG. 6  COMPARISON OF SURFACE DENSITY OF PRESSED (A) AND MOLDED (B) ANODES. ILLUMINATION AT AN ANGLE.

FIG. 7  COMPARISON OF DF AND CAPACITANCE CHANGE WITH FREQUENCY FOR MOLDED AND PRESSED ANODE STCs MADE FROM TYPE A POWDER

FIG. 8  COMPARISON OF DF AND CAPACITANCE CHANGE WITH FREQUENCY FOR MOLDED AND PRESSED ANODE STCs MADE FROM TYPE B POWDER

POROUS ELECTRODES AND ELECTROLYTIC CAPACITORS MADE THEREFROM

This is a division of application Ser. No. 182,782 filed Sept. 12, 1972 now abandoned which in turn a continuation-in-part of Application Ser. No. 17,519 filed Mar. 7, 1970, now abandoned, which in turn is a continuation-in-part of application Ser. No. 810,405, filed Sept. 13, 1968, now abandoned which, in turn is a division of Application Ser. No. 552,312, filed May 23, 1966, now U.S. Pat. No. 3,422,515.

The present invention relates to solid electrolytic capacitors and more particularly to the means and methods for providing anodes for solid electrolytic capacitors.

In an embodiment of the present invention, a frozen mass of powder is thawed, dried, and sintered to obtain a porous sintered mass of metal. A lead wire is then welded or otherwise attached to the slug to complete an anode for a solid electrolytic capacitor. An anodic oxide film, semiconductor coating and conductive coating are applied to the porous sintered mass discussed above.

In the past, solid electrolytic capacitors have been manufactured by the following method: a sintered porous slug of metal, obtained by pressing and sintering metallic powder, is anodized in an electrolyte to form an oxide layer on the surface thereof. The oxide layer serves as a dielectric layer for the capacitor. The porous sintered slug serves as an anode. A film of semiconductor material is deposited over the dielectric oxide layer and a film of conductive material is deposited over the semiconductor film. The semiconductor film, conductive material and terminating means attached to the conductive material comprise the cathode of the capacitor. A terminating means is attached directly to the porous sintered slug as the anode lead for the capacitor.

As a specific example of the above established general process, assume that the porous sintered slug is obtained by pressing and sintering tantalum powder. In that case, the dielectric oxide layer formed by anodization in an electrolyte, such as phosphoric acid, is tantalum oxide. The semiconductive film would preferably be manganese dioxide formed by dipping the anodized slugs in an aqueous solution of manganese nitrate and converting the manganese nitrate to manganese dioxide by pyrolysis. A typical conductive layer used on tantalum capacitors is composed of graphite and silver paint.

I found that a porous sintered mass can be obtained by depositing a moistened mass of powder onto a film forming metal foil and sintering the powder to the foil. This particular approach solved many of the problems involved in manufacturing small solid electrolytic capacitors. For instance, several deposits can be formed on a single piece of foil and sintered thereto. The foil can then be processed as a unit until the final step where the individual capacitors are separated.

The elimination of pressing and the binder usually associated therewith significantly reduces contamination problems which reduce the yield and, in some cases, produce undesirable anode characteristics.

In the practice of the present invention it is also possible to sinter a mass of powder without attaching it permanently to the backing foil. In this case, a wire lead is welded or otherwise connected to the sintered slug to produce an anode.

It is to be pointed out that the basic advantages of powder which is allowed to settle in a liquid are maintained. For instance, the powder masses assume a well rounded shape and the density of the powder masses is such that only short sintering times are required to make porous bodies suitable for manufacturing capacitors.

The amount of powder deposited by one method of the present invention is measured by a volumetric method. Cavities of predetermined size are filled with moist powder and the excess is removed. The powder masses are then frozen and can be handled freely as long as they are still frozen.

The powder masses to be deposited on foil can be given any shape or size by the cavity freezing technique of the present invention. This fact provides a great degree of flexibility in capacitor fabrication.

It is an object of the present invention, therefore, to provide a novel method for fabrication solid electrolytic capacitors.

It is another object of the present invention to provide a novel method for fabricating anodes for solid electrolytic capacitors.

It is a further object of the present invention to provide a novel method for fabricating anodes for solid electrolytic capacitors wherein frozen masses of metallic powder are placed on metallic foil and are thawed, dried and sintered.

It is yet another object of the present invention to provide a method for fabricating anodes for solid electrolytic capacitors wherein the usual step of pressing metallic powder and the binder associated therewith is eliminated.

It is still another object of the present invention to provide an anode for solid electrolytic capacitors having improved characteristics compared to anodes fabricated by pressing metallic powder.

It is still a further object of the present invention to provide a porous metallic mass sintered to a metallic member so as to provide an anode for a solid electrolytic capacitor, said porous metallic mass having a shape determined by freezing a moistened mass of metallic powder in a cavity of predetermined shape and size.

It is still a further object of the present invention to provide a novel method for producing capacitor anodes wherein a frozen mass of moistened powder is thawed, dried, and sintered to obtain a porous metal slug and a lead wire is welded or otherwise attached to the slug.

The present invention, in another of its aspects, relates to novel features of the instrumentalities described herein for teaching the principal object of the invention and to the novel principles employed in the instrumentalities whether or not these features and principles may be used in the said object and/or in the said filed.

Other objects of the invention and the nature thereof will become apparent from the following description considered in conjunction with the accompanying drawings and wherein like reference numbers describe elements of similar function therein and wherein the scope of the invention is determined from the claims.

For illustrative purposes, the invention will be described in conjunction with the accompanying drawings in which.

Generally speaking, the present invention is directed to a porous metallic mass so as to provide a desired shaped article for example an anode for a solid electrolytic capacitor, said porous metallic mass having a shape determined by freezing a moistened mass of metallic powder in a cavity of predetermined shape and size. After the powder deposit is frozen, it is placed on a sheet of metal, thawed and dried. The dried deposit is pre-sintered and removed from the sheet to provide individual shaped slugs.

Figure 1:
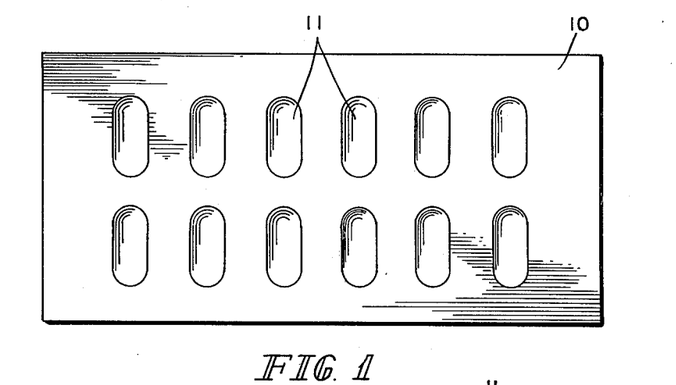
FIG. 1 is a top view of a mold used in the practice of the present invention.

Referring to the drawing, and particularly to FIG. 1, the present invention can be visualized in conjunction with the following description.

A mold 10 having a plurality of cavities 11 having a shape commensurate with the desired final article shape formed therein may be used in the practice of the present invention. The mold 10 can be made of any number of materials which will release the frozen masses of powder easily. It has been found that silicon rubber molds are particularly suitable because silicon rubber retains its elasticity to rather low temperatures and the frozen masses of powder can be removed therefrom by flexing the molds.

The size and shape of the cavities 11 is determined by the size and shape of the anode to be fabricated. There are no general limits to size and shape other than practicality.

Figure 2:
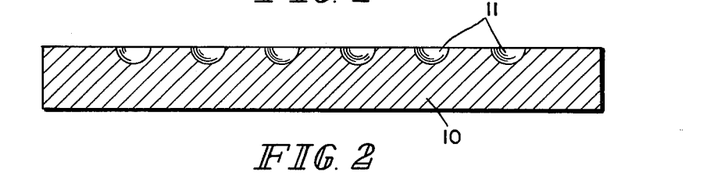
FIG. 2 is a side-sectional view of the mold shown in FIG. 1 wherein the depth of the cavities in the mold is illustrated.

Referring now to FIG. 2, a sectional view of the mold shown in FIG. 1 is shown. It can be seen that the cavities 11 are formed so as to give a rounded shape to the powder deposits frozen therein. This type of deposit is generally easier to remove from the mold than other types such as deposits having square shapes.

A satisfactory silicon rubber mold of the type shown in FIG. 1 has been made by machining a pattern of the shape shown in FIG. 1 into an aluminum plate. The silicon rubber was poured over the pattern and permitted to cure. For example, tantalum powder deposits frozen in silicon rubber molds made in the manner described above weighed from 10 milligrams to 100 grams, having the shape illustrated in FIG. 1.

Figure 3:
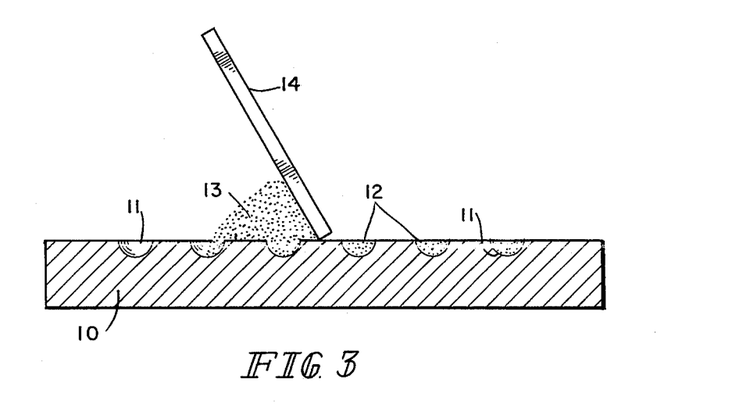
FIG. 3 is a view illustrating a simple means for depositing controlled amounts of moist powder in the cavities of the mold.

Referring now to FIG. 3, a simplified technique for using the mold shown in FIG. 1 and 2 can be discussed. It can be seen that the controlled deposits 12 of moistened powder are deposited in the cavities 11 by scraping a moistened mass of powder 13 across the top surface of the mold 10 with a straight edge means 14. The excess powder is removed by the straight edge means 14 as the cavities 11 are filled. After the cavities are filled the mold and moistened mass of powder are preferably dried partially, to remove excess moisture which would at a later stage of the process lead to a loss of shape of the deposits. They are then subjected to temperatures which will solidly freeze the moistening agent, thereby hardening the deposits. After the deposits 12 are frozen, the mold 10 is flexed, or otherwise handled, so as to remove the frozen deposits. The deposits 12 are then maintained in a suitable environment until they can be placed on the receiving foil.

A mechanical refrigeration system, liquid nitrogen environment, etc. can be used to freeze the deposits 12, as well as to store them until they are placed on the receiving foil.

Figures 4, 5:
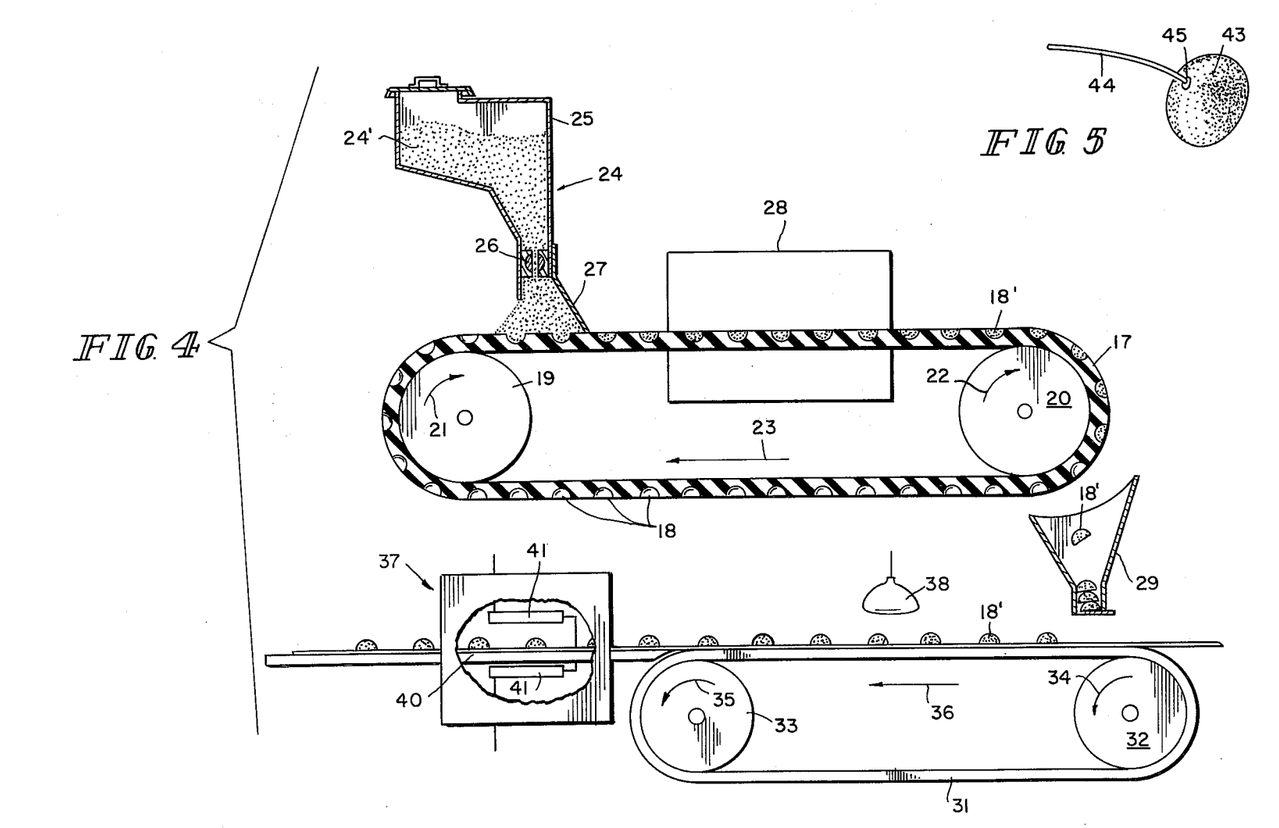
FIG. 4 is a view illustrating a possible setup for continuously freezing moistened powder and depositing the frozen masses of powder on a continuous strip of foil.
FIG. 5 is a perspective view of a sintered slug with a lead wire welded thereto.

Referring now to FIG. 4, an illustrative setup for continuously freezing powder deposits and applying said deposits to a foil strip can be discussed.

There is a continuous belt 17 having cavities 18 formed therein as shown. The belt 17 is mounted on a pair of drums 19 and 20 so as to be driven thereby. The drum 19 rotates in the direction of the arrow 21 and the drum 20 rotates in the direction of the arrow 22. Consequently, the belt 17 moves in the direction of the arrow 23.

There is a powder dispensing means 24 adapted to dispense moist powder 24' into the cavities 18. The powder dispensing means is comprised of a powder container portion 25, valve means 26 for controlling the flow of moist powder 24' to the cavities 18, and straight edge means 27 for removing excess powder 24' from the cavities 18.

It can be seen that as the belt 17 moves in the direction of the arrow 23, the cavities 18 are continually filled with a controlled amount of moist powder 24'. The deposits may be dried between 24 and 28.

There is a refrigeration means 28 disposed adjacent to the powder dispensing means 24 for freezing the moist powder deposits 18' in the cavities 18. As stated previously, the refrigeration means 28 must be capable of freezing the moist powder deposits 18' solid. It may be a mechanical refrigeration system, a liquid nitrogen system, etc.

After the powder deposits 18' in the cavities 18 are frozen solid and the belt 17 continues around the drum 20, flexing of the belt 17 as it moves around the drum 20 causes the frozen deposits 18' to fall into and through a cold storage and guide means 29 to a strip of receiving foil 20. The drum 20 and portion of the belt 17 moving thereon and the cold storage and guide means 29 are maintained at a temperature which will keep the powder deposits 18' frozen until they are placed on the foil strip 30.

A continuous belt 31 is mounted on drums 32 and 33. The drum 32 rotates in the direction of the arrow 34 and the drum 33 rotates in the direction of the arrow 35. Consequently, the belt 31 moves in the direction of the arrow 36 toward a sintering furnace 37.

There is a heating means 38 placed as shown for thawing and drying the frozen deposits 18'. The heating means 38 may be a simple infrared lamp. Similar heating may be used between 24 and 28.

The sintering furnace 37 includes a support member 40 adapted to receive the belt 31 and a pair of resistance heated platens 41 for developing the sintering temperature. The sintering temperature may be developed by an induction heated as well as a resistance heater.

The powder deposits 18' are sintered in the sintering furnace 37. After sintering, the powder deposits 18 are removed from the belt. They are porous sintered masses suitable for fabricating capacitor anodes.

The present invention is an ideal method for fabricating anodes for solid electrolytic tantalum capacitors. The following process illustrates the present invention as applied to tantalum anodes.

Tantalum powder is mixed with water and transferred onto a mold such as the mold 10 shown in FIG. 1. The use of dry powder is possible if the cavities have been pre-filled with water, but more reliable filling of the molds and better wetting of the powder is obtained with moistened powder. Th following range of ratios of powder weight to water weight was found to be satisfactory; about 5–20 parts by weight powder to 1 part by weight of water.

It is essential that the powder settle in an excess of water in the cavities and fill them completely after settling.

The process works best with powder that contains a certain fraction of powder particles in the low micron range. Commercially available tantalum powder, for example, powder grades with average Fisher particle diameters of 10–4 microns, respectively operate very efficiently. However, low capacitance powders, with average Fisher particle Diameters of 100 microns may not work as efficiently with the above technique since the dried powder compacts before sintering will not have sufficient green strength and may crumble. The excess powder is removed leaving the cavities 11 filled with a predetermined amount of moist tantalum powder. After the excess slurry has been scraped off one finds an excess of water on the top of the cavities. After freezing, transfer to the sintering furnace and thawing on the tape support member 40 carrying the pellet through the furnace one finds that this excess amount of water leads to the disintegration of the pellet and losses of shape since the powder starts to flow in any excess of water. It is important, therefore, that this excess amount of water be removed prior to freezing. For example, the water content of the moist tantalum powder after scraping is between about 4 and 20 percent by weight depending upon the powder grade. By drying under infrared lamps or other suitable means the moisture content is generally reduced to about 2 to 10 percent depending on the powder grade. Obviously, too little water will nt give satisfactory freezing of the moist powder and loss of powder and strength will result.

The given percentages are approximate figures and must be varied with the type of powder used. For example, powders with the lower average particle size will require somewhat higher percentages of water than those with higher average particle sizes.

| Average particle size: | Before Drying | After Drying |
|---|---|---|
| 10 | 6.5% by weight | 5% by weight |
| 4 | 10.8% by weight | 9.5% by weight |

The mold with the moist tantalum powder is cooled until the water is acidified. The frozen tantalum powder deposits are removed from the mold and then placed on tantalum foil. After the frozen deposits are placed on the tantalum foil, they are thawed and dried. The tantalum foil with the deposit disposed thereon is then placed in a sintering furnace where the tantalum powder is sintered. The sintering is carried out from 1800°C to 2500°C for 1 to 60 minutes. The higher sintering temperatures require less time. Sintered density should be below about 12 g/cc.

The sintering must take place in an inert atmosphere or in a vacuum. It has been fond that high purity tantalum powder can be adequately sintered in a high purity argon atmosphere. The tantalum pellets will normally be sintered on tantalum sheet. It has been found that this can be done without excessive sticking of the pellet to the foil by using annealed tantalum foil. Also the partial drying of the powder in the cavities eliminates the formation of any liquid slurry on the tape afer thawing which would otherwise provide intimate contact between the support sheet and the porous pellet and lead to excessive sticking.

After removal of the sintered anode from the belt a lead wire is welded or otherwise attached to a sintered slug of metal obtained by the freezing, thawing, drying and sintering techniques described in this specification. More specifically, the pellets are produced by freezing moistened powder in cavities, placing th frozen powder masses on a sheet of the same metal, thawing the powder, drying the powder, presintering the powder, removing the resulting slugs from the sheet and resintering the slugs. Suitable lead wires may be welded to the slugs before the resintering operation to complete the anode.

FIG. 5 is an illustration of a porous sintered slug 43 with a lead wire 44 attached thereto at th point 45. The lead wire 44 will usually be welded to the slug 43.

Resulting anodes generally have a specific capacitance of at least 2,000 uFV/g and a volumetric efficiency of at least 20,000 uFV/cc.. The dissipation factor (DF) and capacitance of capacitors made from molded anodes vary less with frequency than similar capacitors made from pressed anodes. This is shown in Tables 1 and 2 for capacitor anodes made from powder with ave. Fisher particle sizes of 4 to 10 microns, respectively.

Table 1

Change of DF and capacitance with frequency for capacitors made from molded and pressed anodes and from powder with Fisher ave. particle diameter of 4 microns.

| | Frequency | 120 | 1,000 | 5,000 | 10,000 Hz |
|---|---|---|---|---|---|
| DF (%) | Molded | 5.5 | 29 | 100 | — |
| | Pressed | 7.5 | 36 | 120 | — |
| C/C 120 Hz | Molded | 1 | .982 | .955 | .865 |
| | Pressed | 1 | .95 | .85 | .70 |

Table 2

| | Frequency | 120 | 1,000 | 5,000 | 10,000Hz |
|---|---|---|---|---|---|
| DF (%) | Molded | 1.5 | 5.5 | 20 | 40 |
| | Pressed | 2.5 | 10 | 37 | 58 |
| C/C 120 Hz | Molded | 1 | .98 | .958 | .935 |
| | Pressed | 1 | .98 | .91 | .803 | with ave. Fisher particle diameter of 10 microns

The DF is generally 20 to 50% less for molded anodes at all frequencies, except for the 4 micron powder anodes at 5,000 and 10,000 Hz where the difference is less. The capacitance decrease (capacitance at 120 Hz = 100%) at 10,000 Hz is only 6.5 to 13.5% for molded anodes versus 19.7 to 30% for pressed anodes.

Porous tantalum slugs with tantalum lead wires attached thereto have been fabricated by the process just described. Frozen masses of moistened tantalum powder were thawed, dried, and presintered on a sheet of tantalum. The presintering was carried out from 1800°–2000°C for about 1–20 minutes, preferably 1800°–1900°C for 2–10 minutes. The resulting tantalum slugs were removed from the tantalum sheet, tantalum lead wires were attached and the slugs were resintered at temperatures between 1800° and 2500°C. for 1 minute to 60 minutes. After the resintering operation, the resulting tantalum anodes were anodized and semiconductor and conductive coatings were applied, e.e. manganese dioxide, carbon and silver.

EXAMPLE I

Two types of tantalum powders were used in evaluating the properties of binderless molded anodes.

Type A. High Capacitance, low voltage powder with a Fisher average particle diameter of 4 microns.

Type B. Low Capacitance, high voltage powder, with a Fisher average particle diameter of 10 microns.

Table 3 gives some physical characteristics and the sintering conditions of the anodes tested. The table also contains data for comparable pressed anodes.

The major difference lies in the density which is 31% lower for molded anodes made of type A powder and 15% lower for type B. The "green" density before sintering is lower by about 25% for both types of molded anodes. Besides being characterized by lower overall density, molded anodes do not show density gradients which are difficult to avoid in pressed anodes.

Table 3

Physical Data of Molded Anodes

| | | Powder Type A | | Powder Type B | |
|---|---|---|---|---|---|
| | | Molded Anodes | Pressed Anodes | Molded Anodes | Pressed Anodes |
| Size (inch) | | .2" × .2" × .45" | .25" dia. | .2" × .2" × .45" | .25" dia. |
| Weight (grams) | | 1.5 | 1.8 | 2.0 | 1.8 |
| "green" density (g/cc) | 5.6 | 7.5 | 7.2 | 9.5 | |
| Final sintered density (g/cc) | 6.6 | 9.6 | 9.8 | 11.5 | |
| Linear shrinkage (%) | length | 7.1 | 6.4 | 9.5 | 5.4 |
| | diameter | 7.1 | 6.8 | 9.5 | 6.4 |
| Sinter temperature (°C) | 1900 | 1850 | 2130 | 2150 | |
| Sinter time (min) | | 20 | 30 | 30 | 30 |

Figure 6:
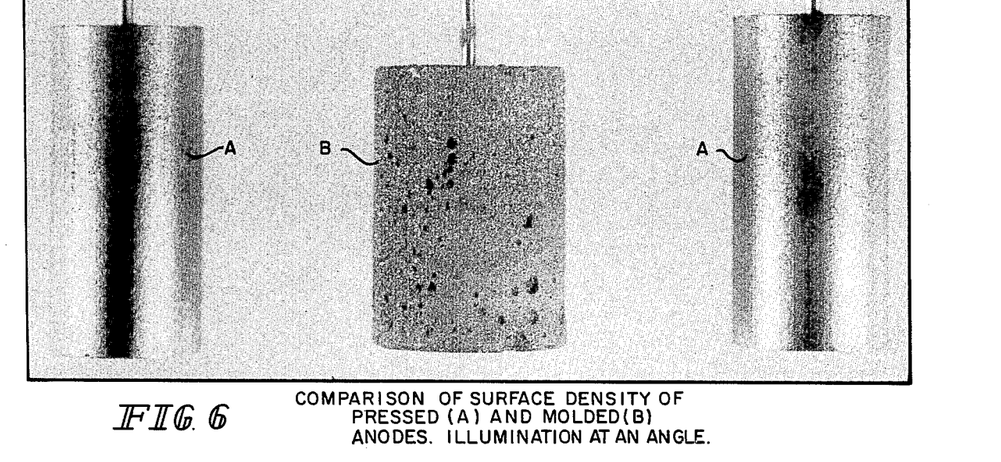
FIG. 6 is a photograph comparison of the surface density of pressed anodes and molded anodes.

Pressed anodes tend to suffer from high surface density as is illustrated by FIG. 6 which shows pressed and molded anodes under intense illumination at an angle. The high surface density of pressed anodes is revealed by the strong reflection of light. By contrast, the surface of a molded anode is uniformly dull and nonreflecting.

EXAMPLE II

In Table 4 some wet cells tests have been summarized. Wet cell evaluations were done under the following conditions: For wet cell tests the anodic oxide was formed at 92.0 ± .2°C, at a constant current of 35 ma/gram up to 200 volts, in 0.01% phosphoric acid solution. The pellets were held at 200 volts for 2 hours.

The tests were performed in 10% phosphoric acid (by volume) at room temperature except for the DCL test which was performed in the forming solution at 25°C and 140V.

The wet cell leakage current is somewhat lower for molded anodes, which indicates lower impurity content.

Table 4

Wet Cell Tests of Molded and Pressed Anodes

| | Powder Type A | | Powder Type B | |
|---|---|---|---|---|
| | Molded Anodes | Pressed Anodes | Molded Anodes | Pressed Anodes |
| Formation/Test voltage | 200/140 | 200/140 | 200/140 | 200/140 |
| Leakage uA $uF^{-1}V^{-1} \times 10^5$ | 25.2 | 27 | 19.4 | 25 |
| Spec. capacitance, $uF\ V\ g^{-1}$ | 5,330 | 4,800 | 2,230 | 1,980 |
| Vol. efficiency, $uF\ V\ cm^{-3}$ | 34,910 | 46,00 | 22,250 | 22,650 |
| ESR ohm/anode | 3.3 | 9.2 | 4.5 | 11.6 |

The specific capacitance per gram is higher by 11% for type A and by 12.5% for type B anodes while the volumetric efficiency is lower by 24% for type A and by 2% for type B anodes. This is due to the different particle size distributions for the two powder grades used.

When comparing the equivalent series resistance of molded and pressed anodes one has to take into account their somewhat different sizes and shapes. However, it is believed the difference is significant and reflects the lower density of molded anodes.

EXAMPLE III — SOLID TANTALUM CAPACITORS

Finished devices of molded and pressed anodes were produced by the standard process for making solid tantalum capacitors. After sintering in vacuum the anodes were anodized in dilute phosphoric acid at 85°C. Manganese oxide was applied by means of thermal decomposition of aqueous manganese nitrate solution. Cathode contacts of colloidal graphite and silver paint were applied before hermetic encapsulation in metal cans. The evaluation was done for two ratings as given below:

|  | Capacitance | Operating Voltage | Formation Voltage | Dissipation Factor (120 Hz)(ave) |
| --- | --- | --- | --- | --- |
| Powder type A | 330 uF | 6 VDC | 24 VDC | .035 |
| Powder type B | 22 uF | 50 VDC | 190 VDC | .007 |

Dissipation Factor (DF). The DF of solid tantalum capacitors is, among other factors determined by the porosity of the anode. The higher the porosity the lower the dissipation factor will be, all other factors remaining constant. If the porosity of anodes is nonuniform, as is frequently the case with pressed anodes, one expects to find variations in DF from capacitor to capacitor. The dissipation factor now depends on two factors: The "mean" porosity, as well as the distribution of porosity. The surface porosity frequently varies from one end of the anode to the other being lowest in the middle, and is generally higher than the bulk density.

Figure 7:
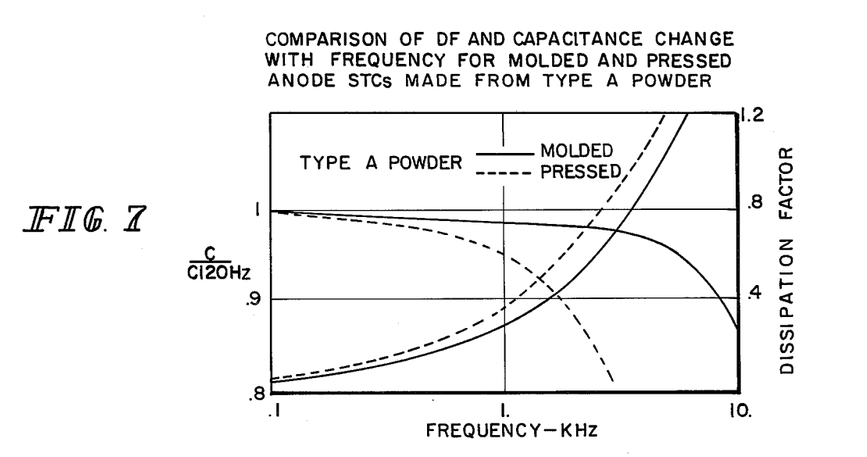
FIG. 7 is a comparison of capacitance and dissipation factor with frequency for molded and pressed anodes made from one type of powder.
Figure 8:
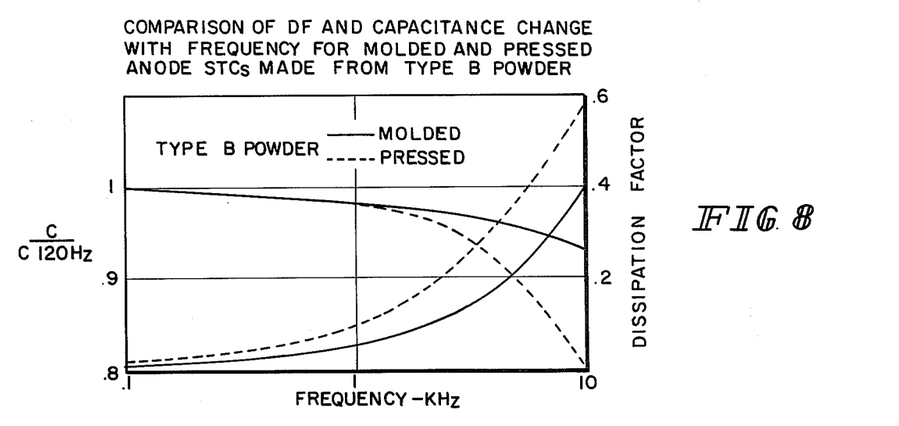
FIG. 8 is a comparison of capacitance and dissipation factor with change in frequency for molded and pressed anodes for another type of capacitor.

Molded anodes with uniform density throughout produced tightly grouped DF's the average of which was lower and it is believed the eason is the minimal density of molded anodes. In FIGS. 7 and 8 capacitance and dissipation factor were measured as a function of frequency up to 10 kHz for types A and B powder. For comparison capacitors of equal rating made from conventional pressed anodes have been included. There is less rapid loss of capacitance and less rapid increase in dissipation factor with increasing frequency.

EXAMPLE IV

The Initial DC Leakage Current (DCL). The DCL of finished devices measured after encapsulation, "burn-in" and aging was measured for molded and pressed anodes.

Figure 9:
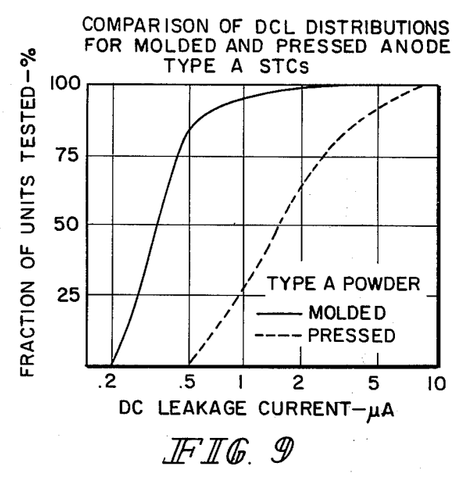
FIG. 9 is a comparison of D.C. leakage distributions of molded and pressed anodes, for one size of powder.
Figure 10:
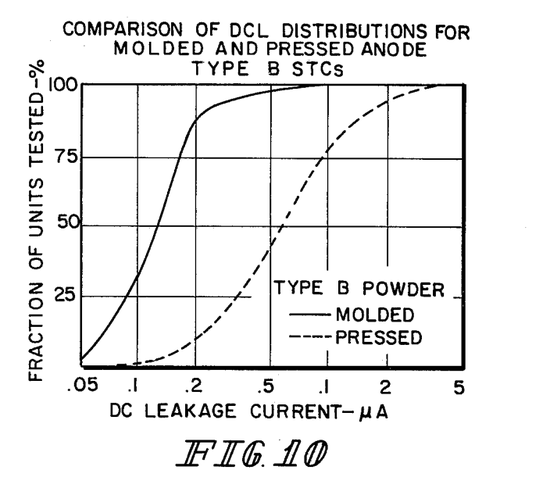
FIG. 10 is a comparison of D.C. leakage distributions of molded and pressed anodes, for another size of powder.

FIGS. 9 and 10 give the integral DCL distribution for STCs made from molded and pressed anodes which were processed under the same conditions. FIG. 9 shows the distributions for 6 volt capacitors.

Pressed anodes show a distribution covering a much wider current range as well as leakage currents which are higher by a factor of five when compared to molded anode capacitors. The latter show a distribution with 85% falling in the range 0.2 to 0.5 uA. Practically none from the other group fall into this low current range. FIG. 10 gives similar distributions for 50V capacitors. Again, those made from pressed anodes cover a wider current range and leakage currents are higher by about a factor of five. Capacitors made from molded anodes show a much narrower distribution with 90% of all units falling into the .05 to 0.2 uA interval as compared to only 10% for pressed anodes.

EXAMPLE V

Figure 11:
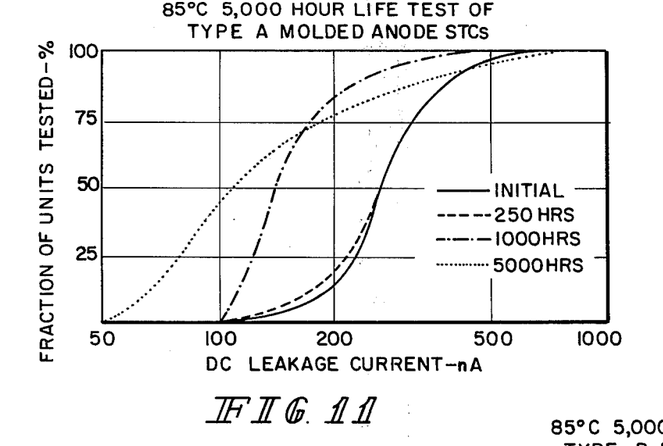
FIG. 11 is plot of life testing for 5000 hours of six volt solid tantalum capacitors.
Figure 12:
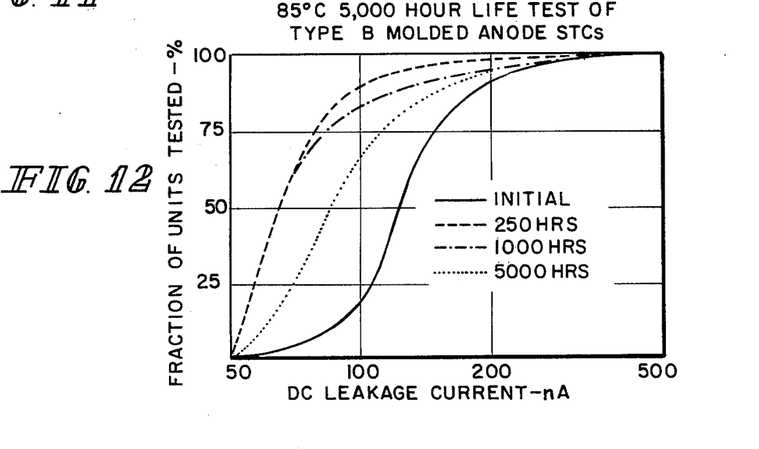
FIG. 12 is plot of life testing for 5000 hours of fifty volt solid tantalum capacitors.

Life testing at 85°C was carried out at rated voltage. FIGS. 11 and 12 show the results of 5,000 hours of testing at 6V and 50V, respectively.

After the completion of the test 95% of the type A units were found to have leakage currents under 0.5 uA, the same figure as for the initial distribution. The distribution had widened after 5,000 hours, but it had spread to lower current values suggesting a stabilization of the device characteristics. FIG. 14 gives the results for type B anodes. The initial distribution shows 90% of the units to be below 0.2 uA and 18% below 0.1 uA. After 5,000 hours 95% of the units were found to be below 0.2 uA, with 65% below .1 uA. The stability of DCL devices made from molded anodes is excellent which indicates that the devices were free of serious defects.

The present invention, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. An electrical capacitor preform comprising a mass of tantalum powder held together in a predetermined shape by frozen water.

2. The anode preform of claim 1, wherein the anode preform includes about 2 to 20 parts by weight powder for each part of water.

3. The anode preform of claim 2, wherein the tantalum powder has a particle size of up to 10 microns.

4. The anode preform of claim 2, wherein the anode preform includes about 2 to 10 parts by weight powder for each part of water.

* * * * *

UNITED STATES PATENT AND TRADEMARK OFFICE
CERTIFICATE OF CORRECTION

PATENT NO. : 3,976,435
DATED : August 24, 1976
INVENTOR(S) : Gerhart P. Klein

It is certified that error appears in the above-identified patent and that said Letters Patent are hereby corrected as shown below:

Col. 5, line 26, cancel "Th" and insert ---The---.

Col. 5, line 61, cancel "nt" and insert ---not---.

Col. 6, line 9, cancel "acidified" and insert ---solidified---.

Col. 6, line 20, cancel "fond" and insert ---found---.

Col. 6, line 27, cancel "afer" and insert ---after---.

Col. 6, line 36, cancel "th" and insert ---the---.

Col. 6, line 44, cancel "th" and insert ---the---.

Col. 9, line 38, cancel "eason" and insert ---reason---.

Signed and Sealed this

Twenty-fifth Day of January 1977

[SEAL]

Attest:

RUTH C. MASON
Attesting Officer

C. MARSHALL DANN
Commissioner of Patents and Trademarks